United States Patent
Fujii et al.

(10) Patent No.: US 9,678,608 B2
(45) Date of Patent: Jun. 13, 2017

(54) APPARATUS AND METHOD FOR CONTROLLING AN INTERFACE BASED ON BENDING

(71) Applicant: Sony Corporation, Tokyo (JP)

(72) Inventors: Hiromitsu Fujii, Tokyo (JP); Kentaro Ida, Tokyo (JP)

(73) Assignees: Sony Corporation, Tokyo (JP); Sony Mobile Communication Inc., Tokyo (JP)

( * ) Notice: Subject to any disclaimer, the term of this patent is extended or adjusted under 35 U.S.C. 154(b) by 202 days.

(21) Appl. No.: 13/910,741

(22) Filed: Jun. 5, 2013

(65) Prior Publication Data

US 2014/0362023 A1  Dec. 11, 2014

(51) Int. Cl.
- *G06F 1/00* (2006.01)
- *G06F 3/044* (2006.01)
- *G06F 1/16* (2006.01)

(52) U.S. Cl.
CPC ............ *G06F 3/044* (2013.01); *G06F 1/1652* (2013.01); *G06F 2203/04102* (2013.01)

(58) Field of Classification Search
CPC .......... G06F 1/00; G06F 3/044; G06F 3/0416; G06F 3/00
USPC ................................................. 345/173–179
See application file for complete search history.

(56) References Cited

U.S. PATENT DOCUMENTS

| | | | | |
|---|---|---|---|---|
| 7,522,153 | B2 * | 4/2009 | Ohtsuka ........................ | 345/156 |
| 2009/0066663 | A1 * | 3/2009 | Chang et al. ................. | 345/173 |
| 2011/0167391 | A1 * | 7/2011 | Momeyer ............. | G06F 1/1684 715/863 |
| 2013/0162546 | A1 * | 6/2013 | Yeh ........................ | G06F 3/0221 345/173 |
| 2014/0172373 | A1 * | 6/2014 | Edwards ................. | G06F 3/011 702/189 |

OTHER PUBLICATIONS

Extended European Search Report issued Oct. 13, 2014 in Patent Application No. 13182473.2.
U.S. Appl. No. 13/969,261, filed Aug. 16, 2013, Fujii, et al.

\* cited by examiner

*Primary Examiner* — Michael Faragalla
(74) *Attorney, Agent, or Firm* — Oblon, McClelland, Maier & Neustadt, L.L.P.

(57) ABSTRACT

An apparatus includes a touch panel display. The touch panel display may include one or more sensors for detecting an input operation on the touch panel display. The input operation may correspond to bending the touch panel display. The apparatus may include circuitry configured to determine a distribution pattern corresponding to sensor values and coordinates output when the input operation is detected. The circuitry may determine, based on the distribution pattern, one or more features of the bending of the touch panel display. The circuitry may execute a predetermined function or process corresponding to the features of the bending.

20 Claims, 8 Drawing Sheets

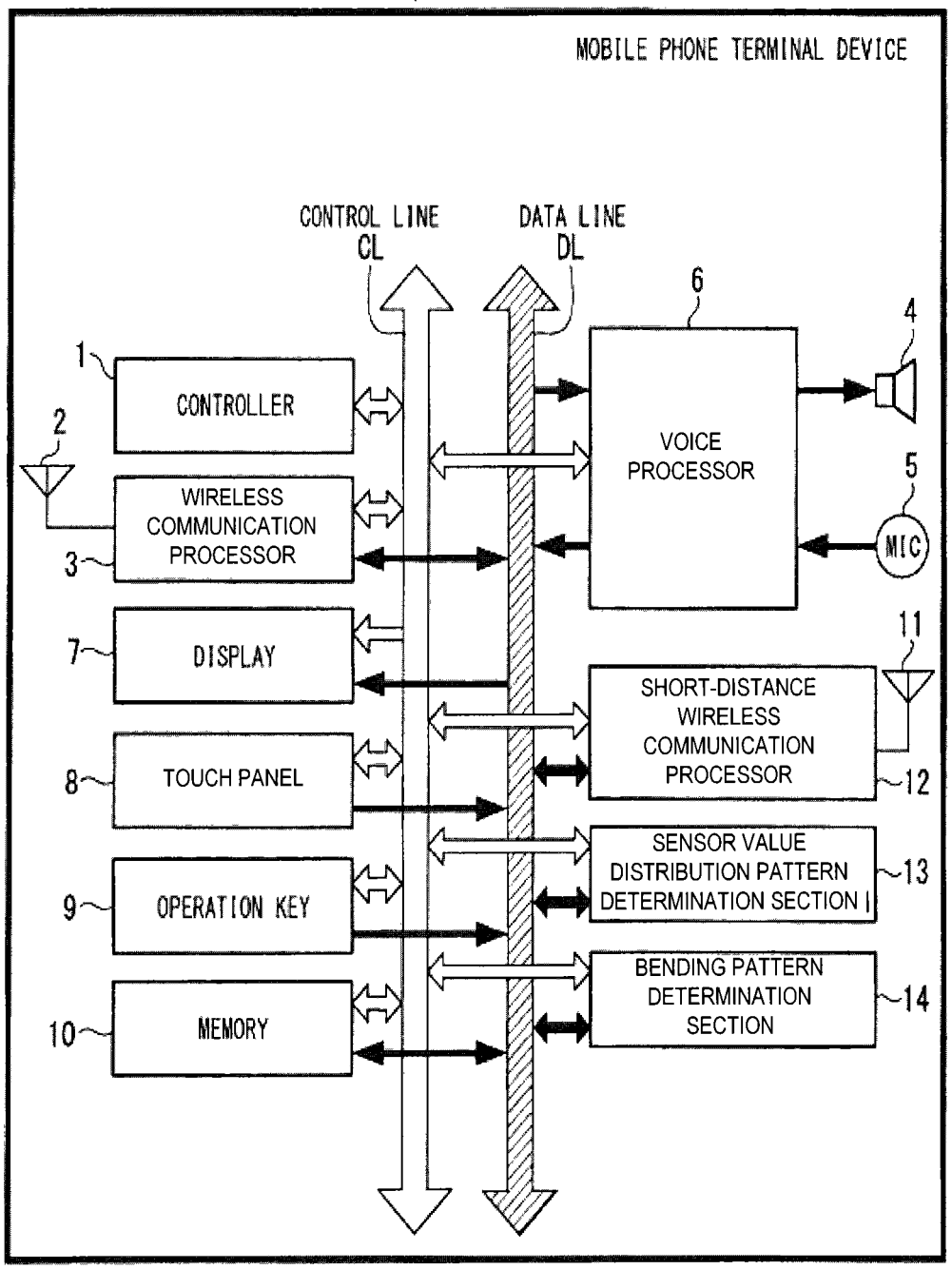

ns to perform

APPARATUS AND METHOD FOR CONTROLLING AN INTERFACE BASED ON BENDING

BACKGROUND

Technical Field

The present disclosure relates to a method and apparatus for controlling an interface based on bending. In particular, the present disclosure relates to detecting aspects of bending a mobile device, and controlling the interface based on the detection.

Description of Related Art

In recent years, mobile devices such as smart phones and tablet computers utilize touch panels as operational input interfaces. For example, a mobile device may include a touch panel that detects when an instruction object such as a user's finger is within a predetermined proximity of an operation surface of the touch panel. The touch panel may also output a coordinate corresponding to the point at which the instruction object was detected. Sensors on a touch panel may detect when the instruction object comes in physical contact with the operation surface, or alternatively may utilize sensors for detecting when the instruction object comes within a range of detection for the particular sensor.

Exemplary touch panel technologies utilized in mobile devices include capacitive and resistive type touch panel displays. Capacitive type touch panel displays may generate uniform electrostatic fields with which to detect instruction objects during input operations. An electrostatic capacitive type touch panel may include several transparent electrodes arranged on the operation surface of the touch panel display in a matrix pattern. When an instruction object contacts or approaches the operation surface of the electrostatic capacitive touch panel, the electrostatic capacitance value of a transparent electrode sensor in the matrix pattern changes.

SUMMARY

In addition to changing electrostatic capacitance values in response to the detection of an instruction object contacting and/or approaching the operation surface of the touch panel display, electrostatic capacitance display panels may detect changes in electrostatic capacitance values of transparent electrodes in response to a change in the touch panel (or sensor pattern) structure itself. A change in structure of the touch panel and/or transparent electrode matrix pattern may occur, for example, when a force imparted on a mobile device bends the touch panel display. Because recent mobile devices include smaller components and thinner protective casings with which to reduce the overall size of mobile devices, recent mobile devices are increasingly susceptible to changes in touch panel structure caused by bending the mobile device.

In one aspect of the present disclosure, an apparatus includes a touch panel display that may include one or more sensors for detecting an input operation on the touch panel display. The input operation may correspond to bending the touch panel display. The apparatus may include circuitry configured to determine a distribution pattern corresponding to sensor values and coordinates output when the input operation is detected. The circuitry may determine, based on the distribution pattern, one or more features of the bending of the touch panel display. The circuitry may execute a predetermined function or process corresponding to the features of the bending.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 illustrates an exemplary block diagram for a mobile device according to one aspect of the present disclosure;

DETAILED DESCRIPTION

Figure 2A:
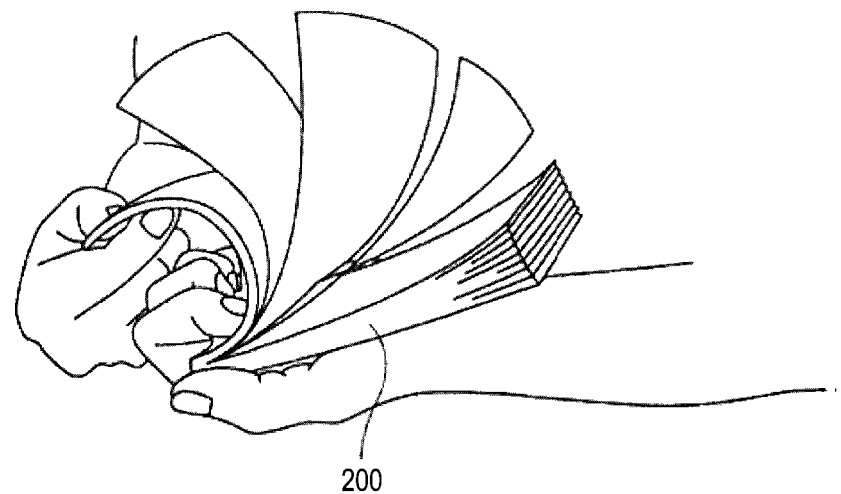
FIG. 2A illustrates an example of a bending operation performed on a book.

Referring now to the drawings, wherein like reference numerals designate identical or corresponding parts throughout the several views.

FIG. 1 illustrates a block diagram for an exemplary mobile device 100. The exemplary mobile device 100 of FIG. 1 includes a controller 1, a wireless communication processor 3 connected to an antenna 2, a speaker 4, a microphone 5, and a voice processor 6.

The controller 1 may include one or more Central Processing Units (CPUs), and may control each element in the mobile device 100 to perform features related to communication control, audio signal processing, control for the audio signal processing, image processing and control, and other kinds signal processing. The controller 1 may perform these features by executing instructions stored in a memory 10 or a non-transitory computer readable medium having instructions stored therein. Further, the controller 1 may perform predetermined functions and/or processing corresponding to a detected bending operation on touch panel 8, as described in further detail in later paragraphs.

The antenna 2 transmits/receives electromagnetic wave signals, e.g., between base stations for performing radio-based communication, such as the various forms of cellular telephone communication.

The wireless communication processor 3 controls communication performed between the mobile device 100 and other external devices via the antenna 2. For example, the wireless communication processor 3 may control communication between the base stations for cellular phone communication.

The speaker 4 emits an audio signal corresponding to audio data supplied from the voice processor 6.

The microphone 5 detects surrounding audio, and converts the detected audio into an audio signal. The audio signal may then be output to the voice processor 6 for further processing.

The voice processor 6 demodulates and/or decodes the audio data read from the memory 10, or audio data received by the wireless communication processor 3 and/or a short-distance wireless communication processor 12. Additionally, the voice processor 6 may decode audio signals obtained from the microphone 5.

The display 7 may be a Liquid Crystal Display (LCD), or another known display screen technology. In addition to displaying images, the display 7 may display operational inputs, such as numbers or icons, which may be used for control of the mobile device 100. The display 7 may additionally display a graphical user interface with which a user may control aspects of the mobile device 100.

Touch panel 8 may include one or more touch sensors for detecting an input operation on an operation surface of the touch panel 8. In certain aspects of the present disclosure, the touch panel 8 may be disposed adjacent to the display 7 (e.g., laminated), or may be formed integrally with the display 7. For simplicity, the present disclosure assumes the touch panel 8 is a capacitance-type touch panel technology; however, it should be appreciated that aspects of the present disclosure may easily be applied to other touch panel types (e.g., resistance type touch panels) with alternate structures. In certain aspects of the present disclosure, the touch panel 8 may include transparent electrode touch sensors arranged in the X-Y direction on the surface of transparent sensor glass.

A touch panel driver may be included in the touch panel 8 for control processing related to the touch panel 8, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel 8. Additionally, the touch panel driver and touch panel 8 may detect when an instruction object, such as a finger, is within a predetermined distance from an operation surface of the touch panel 8. That is, the instruction object does not necessarily need to directly contact the operation surface of the touch panel 8 for touch sensors to detect the instruction object and perform processing described herein. Signals may be transmitted by the touch panel 8 driver, e.g., in response to a detection of a touch operation, in response to a query from another element, based on timed data exchange, etc.

The display 7 and the touch panel 8 may be surrounded by a frame portion of a protective case on the mobile device 100. The mobile device 100 case may additionally enclose the other internal elements of the mobile device 100. As a non-limiting example, the display 7 and touch panel 8 may substantially form a front surface of the mobile device 100, while the remaining external surface of the mobile device 100 may be formed by the case.

The operation key 9 may include one or more buttons or similar external control elements, which may generate an operation signal based on a detected input by the user. These operation signals may be supplied to the controller 1 for performing related processing and control. In certain aspects of the present disclosure, the processing and/or functions associated with external buttons and the like may be performed by the controller 1 in response to a bend operation rather than manipulating the button, key, etc. In this way, external buttons on the mobile device 100 may be eliminated in lieu of performing inputs via bend operations, thereby improving water tightness.

The memory 10 may include, e.g., Read Only Memory (ROM), Random Access Memory (RAM), or a memory array comprised of a combination of volatile and non-volatile memory units. The memory 10 may be utilized as working memory by the controller 1 while executing the processing and algorithms of the present disclosure. Additionally, the memory 10 may be used for long-term storage, e.g., of images and information related thereto.

The antenna 11 may transmit/receive electromagnetic wave signals to/from other external apparatuses, and the short-distance wireless communication processor 12 may control the wireless communication performed between the other external apparatuses. Bluetooth, Wi-Fi, and near-field communication are non-limiting examples of wireless communication protocols that may be used for inter-device communication by the short-distance wireless communication processor 12.

Sensor value distribution pattern determination section 13 detects a distribution pattern resultant from an input operation (e.g., touch) and/or bending operation detected by sensors on the touch panel 8. For example, the sensor value distribution pattern determination section 13 may detect electrostatic capacitance sensor values and coordinates corresponding to a touch input operation and/or sensor outputs from altering the physical structure (e.g., bending) of the touch panel 8. The distribution pattern detected by the touch panel 8 sensors and determined by the sensor value distribution pattern determination section 13 may be matched to predetermined distribution patterns corresponding to processing and functions executed by the controller 1. The predetermined distribution patterns used in the matching may be stored in the memory 10 in advance.

Bending pattern determination section 14 may determine a pattern/manner of bending the mobile device 100 based on the sensor value distribution pattern determined by the sensor value distribution pattern determination section 13. That is, the bending pattern determination part 14 may, for example, correspond the detected sensor value distribution pattern to a particular manner of bending the mobile device 100. For example, the bending pattern determination part 14 may determine, based on the detected sensor value distribution pattern, that the mobile device 100 is bent at a corner, in the center, concave, convex, etc. The predetermined functions and processing executed by the controller 1 may correspond to a manner of bending the mobile device 100 determined by the bending pattern determination part 14. The bending pattern determination part 14 may, e.g., determine a bending pattern based on a shape, an area, or a sensor value magnitude corresponding to the sensor value distribution pattern.

As noted above, aspects of the present disclosure may be drawn to performing processing or functions corresponding to a detected bending of the mobile device 100. For example, the controller 1 may perform a predetermined function and/or process previously matched to a generated pattern of bending the mobile device resulting from, e.g., applying force to a case of the mobile device 100. For illustration purposes, FIG. 2A illustrates an exemplary bending operation performed on a book 200. The exemplary illustration of FIG. 2A shows a user holding the book 200 at a left edge and applying force at an opposing edge of the book 200 such that the book 200 is bent and the pages of the book 200 are turned.

Figure 2B:
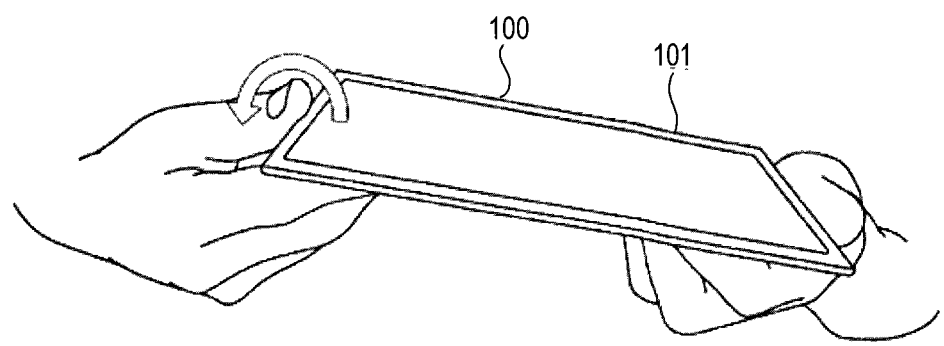
FIG. 2B illustrates an example of the bending operation of FIG. 2A performed on a mobile device.

FIG. 2B illustrates a similar bending operation as that illustrated in FIG. 2A; however, the book 200 illustrated in FIG. 2A has been replaced with the mobile device 100. In this case, a user holds opposing sides of a case 101 included on the mobile device 100 and applies similar force to the mobile device 100 as that described above when flipping the pages of the book 200. In certain aspects of the present disclosure, predetermined functions or processes corresponding to an electronic book reader may correspond to the detected exemplary bending gesture illustrated in FIG. 2B. For example, in response to detecting the gesture illustrated in FIG. 2B, the controller 1 may execute processing such that an electronic book displayed on the mobile device 100 sequentially "turns" its pages.

Figure 3:
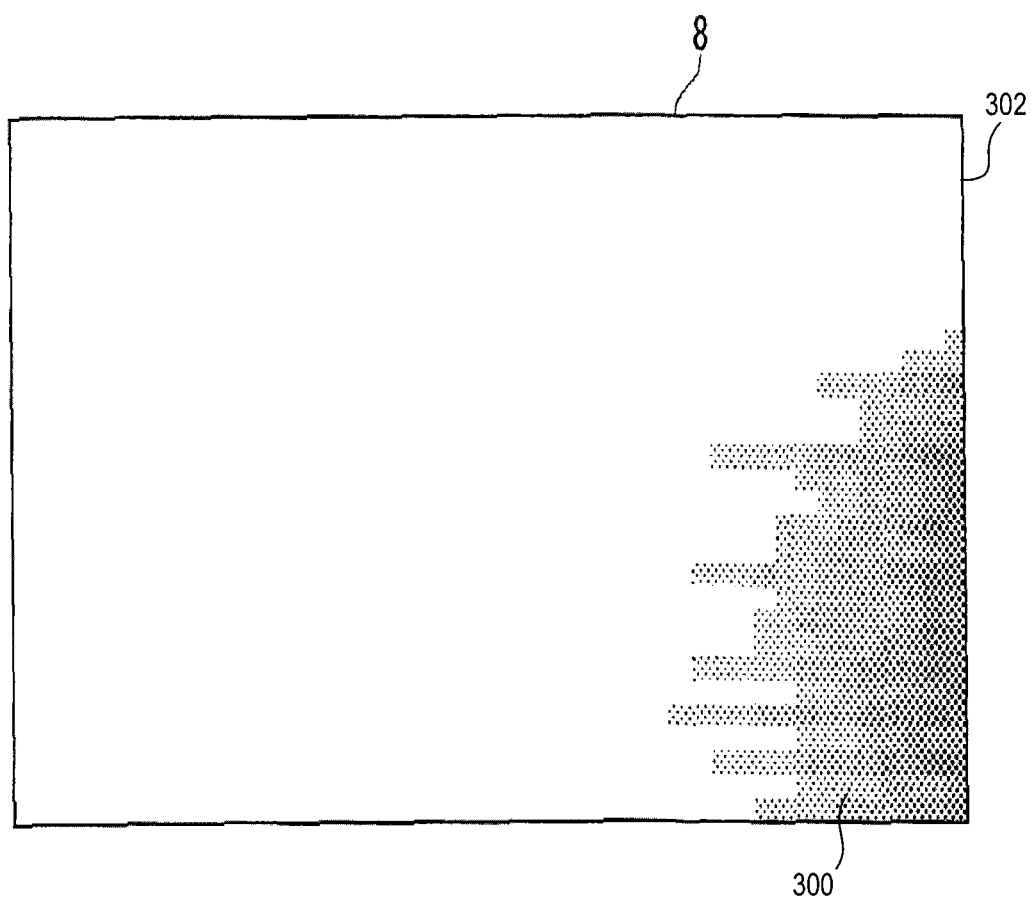
FIG. 3 illustrates an exemplary touch panel sensor output distribution pattern corresponding to the bending operation of FIG. 2B.

Next, FIG. 3 illustrates an exemplary sensor value distribution pattern resulting from the bending operation illustrated and described above with respect to FIGS. 2A and 2B. For simplicity, the touch panel 8 is assumed to be a capacitive type touch panel device, and the case 101 of the mobile device 100 has been omitted from the figure. Turning to FIG. 3, an exemplary electrostatic capacitance value distribution pattern 300 is illustrated on the touch panel 8. The distribution pattern 300 may, for example, result from a bending operation such as that shown in FIGS. 2A and 2B. In certain aspects of the present disclosure, the distribution pattern 300 shown in the figure may correspond to electrostatic capacitance values detected above a reference sensor value. That is, the shaded region represented by the distribution pattern 300 may illustrate exemplary sensor value outputs above a reference sensor value obtained when the touch panel 8 is in a state corresponding to a calibrated zero sensor output value, such as when the touch panel 8 is resting on a desk and/or not being held by a user.

Differences in magnitude of electrostatic capacitance values are illustrated in the distribution pattern 300 using variances in shading darkness. For example, areas in the distribution pattern 300 in which the difference in the sensor output value is of a large magnitude with respect to the reference sensor value are shaded in darker colors, and areas of the distribution pattern 300 in which the magnitude difference of electrostatic capacitance values is a lesser magnitude above the reference value are shaded in lighter colors. In the example in which a user bends the mobile device 100 while performing a page turning operation on an electronic book reader, such as the example shown in FIG. 2B, higher magnitudes of electrostatic capacitance values may be detected on an edge 302 of the touch panel 8, as represented in FIG. 3 with darker shading near the edge 302.

Both the magnitude and area of a distribution pattern of sensor values resulting from a bending operation performed on the mobile device 100 typically contrasts with the area and distribution of sensor values detected when a user performs a touch input operation on an operation surface of the touch panel 8. That is, the sensor output of the touch panel 8 is distinguishably different when a user, e.g., touches the touch panel 8 operational surface with a finger compared to when the touch panel 8 is bent.

Figure 4A:
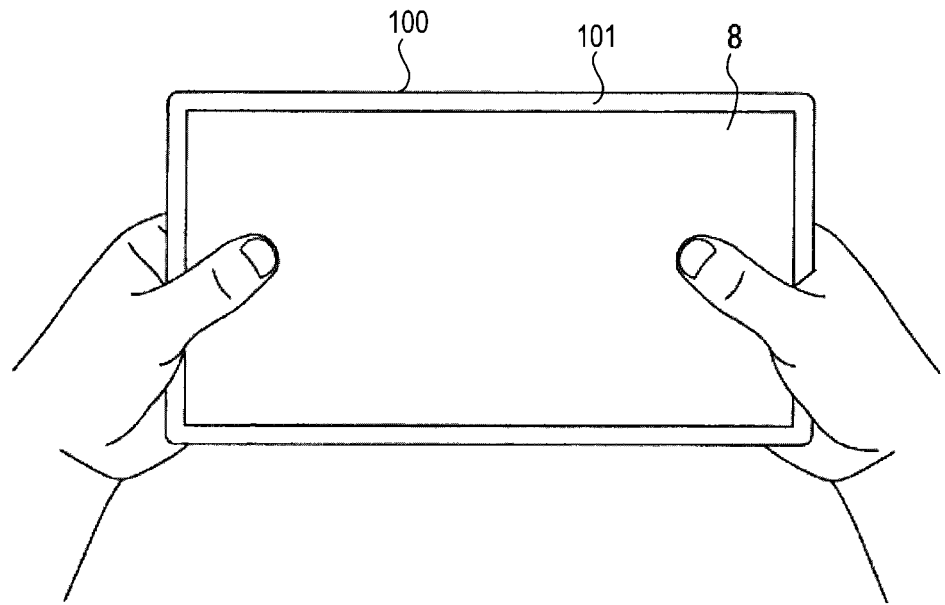
FIG. 4A illustrates an exemplary touch operation performed on an operation surface of a mobile device touch panel.
Figure 4B:
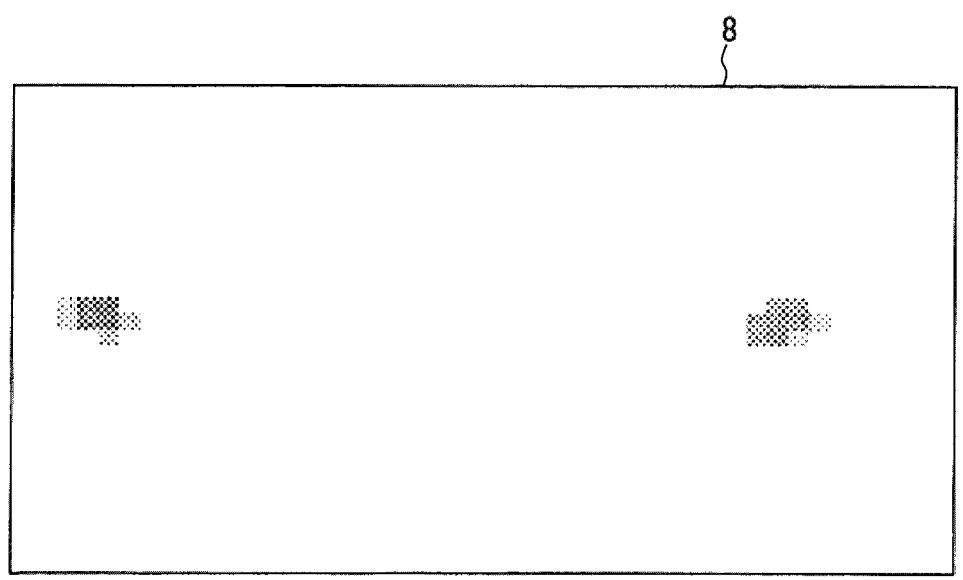
FIG. 4B illustrates an exemplary touch panel sensor output distribution pattern corresponding to the touch operation of FIG. 4A.

As a non-limiting example illustrating the differences in magnitude and area of a sensor value distribution pattern resulting from a user performing a touch operation on the operation surface of the touch panel 8, FIGS. 4A and 4B illustrate a user holding the mobile device 100 on opposing sides such that the user's thumbs are in contact with the touch panel 8. FIGS. 4A and 4B assume a bending operation is not being performed concurrently with the illustrated touch operation.

FIG. 4B illustrates an exemplary electrostatic capacitance value distribution pattern resultant from the touch operation illustrated in FIG. 4A. The coordinates of the distribution patterns illustrated in FIG. 4B correspond to the location of the touch operations performed by the user's thumbs in FIG. 4A. As evident in comparing the distribution patterns illustrated in the examples of FIGS. 3 and 4B, the distribution patterns typically associated with performing touch operations on the operation surface of a touch panel are typically much smaller with respect to bending operations performed on the mobile device. Further, areas on the touch panel 8 experiencing higher degrees of force when bending the mobile device 100 typically have higher magnitudes of electrostatic, capacitance sensor value outputs than the case in which the user touches the operation surface of the touch panel 8. For example, electrostatic capacitance value magnitudes at the edge 302 of the touch panel 8 shown in FIG. 3 are typically higher than the electrostatic capacitance values in the distribution patterns of a typical touch operation, such as that illustrated in FIGS. 4A and 4B. As a non-limiting example, the distribution pattern magnitude of the example shown in FIG. 3 may have electrostatic capacitance values in a range of 220 to 240 units above the baseline reference sensor value, while the distribution pattern illustrated in the example of FIG. 4B may have electrostatic capacitance value magnitudes of 10 to 18 units above the baseline reference sensor value.$_{[GGG1]}$ It should be appreciated, however, that these exemplary capacitance values are provided merely for illustration purposes and other sensor value pattern distributions and/or magnitudes may be detected.

A comparison of distribution patterns generated as a result of a touch operation and those generated as a result of a bending operating may also be performed by the controller 1. The comparison may, in certain aspects of the present disclosure, distinguish between a touch operation and a bending operation detected at or near the same coordinate/location on the touch panel 8. In certain aspects of the present disclosure, the comparison may include comparing the area of the detected distribution pattern with a predetermined threshold area value. For example, the predetermined threshold area value may correspond to an area typical of a touch operation, in which case the controller 1 may determine that the detected distribution pattern corresponds to a bending operation when the area exceeds the predetermined threshold.

In another aspect of the present disclosure, the comparison may include comparing the magnitude of sensor values included in the sensor value distribution pattern to a predetermined threshold magnitude. For example, the predetermined threshold magnitude value may correspond to a sensor output typical of a touch operation, in which case the controller 1 may determine that the detected distribution pattern corresponds to a bending operation when the sensor value magnitude exceeds the threshold value. The above-described comparison process may, e.g., detect/prevent false positive touch operations when a bending operation is performed. The magnitudes of sensor values may, e.g., correspond to a maximum, minimum, mean, or median sensor value of the sensor values included in the distribution pattern. The mean sensor values may, e.g., be calculated using all of the sensor values included in the distribution pattern, or a subset thereof.

In either of the above examples, the predetermined process or function associated with a determined bend operation may be different than processes and/or functions performed for a touch operation (i.e., different processes may be performed when the area/magnitude are above the threshold than when the area/magnitude are below the threshold).

Figure 5A:
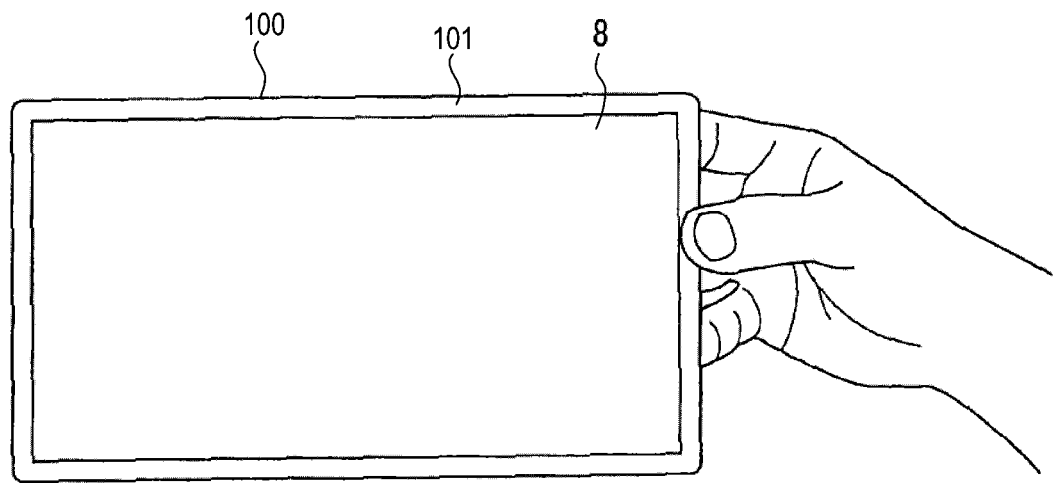
FIG. 5A illustrates another example of a bending operation performed on a mobile device.
Figure 5B:
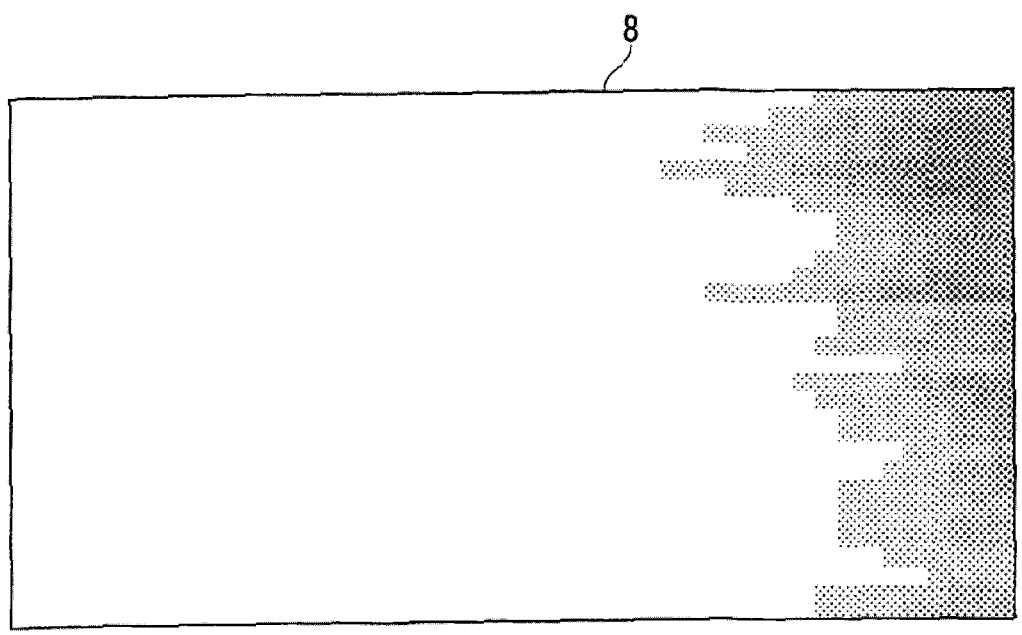
FIG. 5B illustrates an exemplary touch panel sensor output distribution pattern corresponding to the touch operation of FIG. 5A.

As another non-limiting example of an electrostatic capacitance value distribution pattern resulting from a bending operation performed on the mobile device 100, FIG. 5A illustrates a case in which a user holds a substantially center portion of the right edge of the mobile device 100, and FIG. 5B illustrates a resultant electrostatic capacitance value distribution pattern from holding the mobile device 100 as in the illustration of FIG. 5A. As shown in FIG. 5B, holding the mobile device case 101 at a center vicinity on the right edge of the mobile device 100 may result in a widely dispersed electrostatic capacitance value distribution pattern on the right side of the touch panel 8. Higher magnitude electrostatic capacitance values may be sensed at the rightmost edge of the touch panel 8 as a result of increased force applied at those areas during the bending operation of FIG. 5A.

Figure 6A:
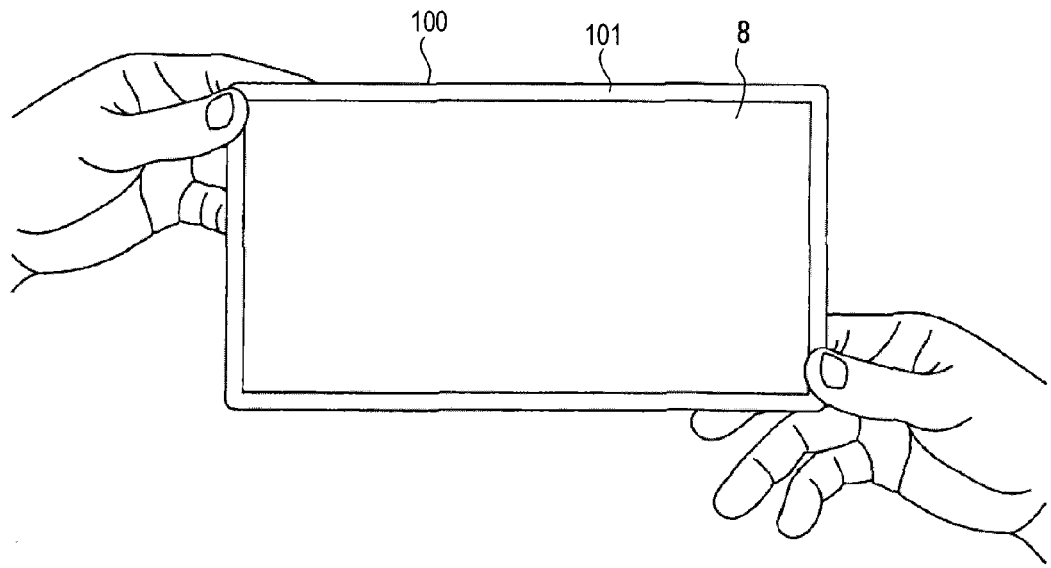
FIG. 6A illustrates another example of a bending operation performed on a mobile device.
Figure 6B:
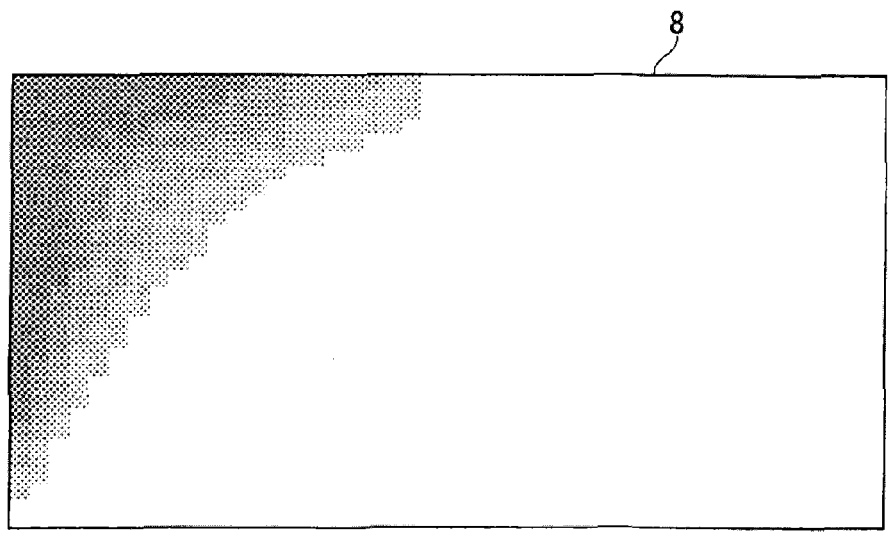
FIG. 6B illustrates an exemplary touch panel sensor output distribution pattern corresponding to the touch operation of FIG. 6A.

Next, FIGS. 6A and 6B illustrate another non-limiting example in which a user holds the mobile device 100 by the case 101 at an upper left and lower right corner of the case 101 while a bending force is applied at the upper left corner of the mobile device 100, resulting in the electrostatic capacitance value distribution illustrated in FIG. 6B. The bending of the mobile device 100 in the example shown in FIG. 6A is assumed to be applied such that an operation surface of the touch panel 8 is bent upwards (i.e., the operation surface is convex), and the resultant electrostatic capacitance value distribution illustrated in FIG. 6B shows the highest magnitude electrostatic capacitance values are experienced at the left and top edges and upper left corner of the touch panel 8. Electrostatic capacitance magnitude decreases as the distribution shown in FIG. 6B moves towards a center region of the touch panel 8.

Figure 7A:
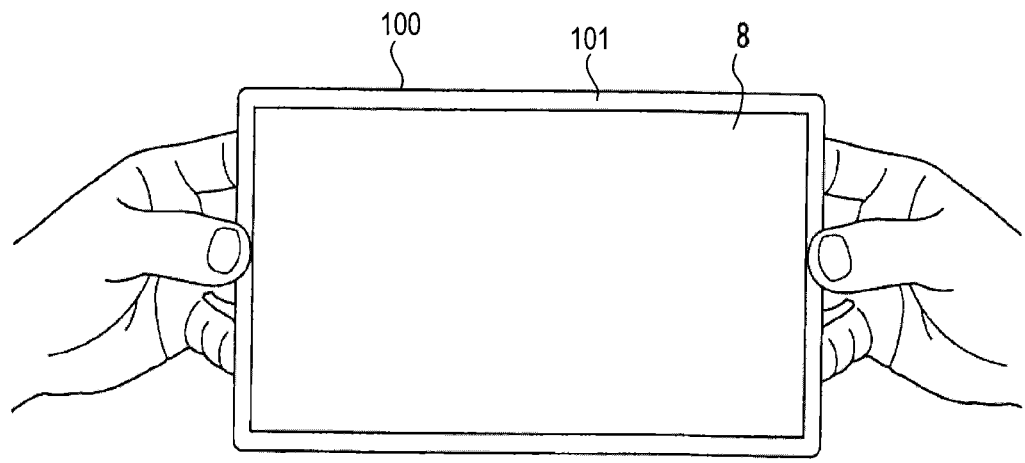
FIG. 7A illustrates another example of a bending operation performed on a mobile device.
Figure 7B:
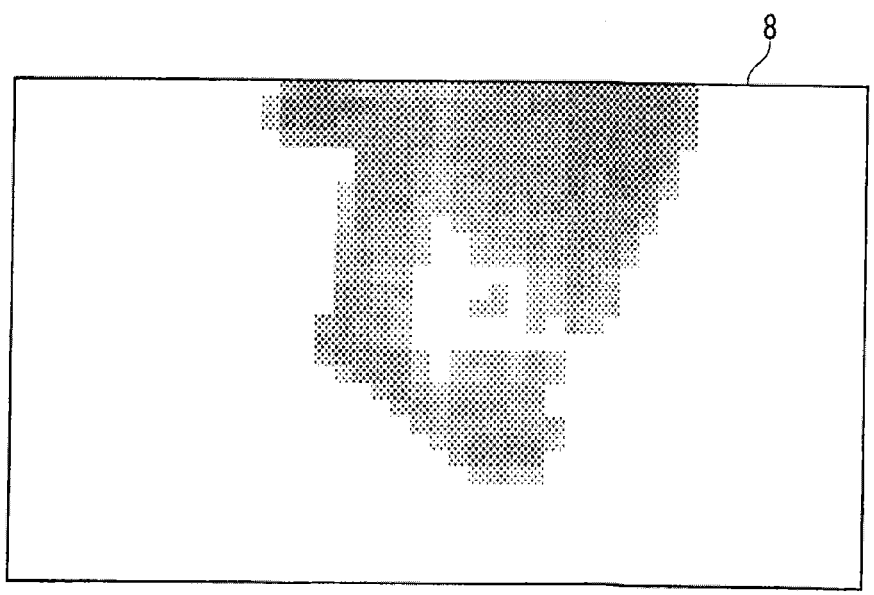
FIG. 7B illustrates an exemplary touch panel sensor output pattern corresponding to the touch operation of FIG. 7A.

Next, FIGS. 7A and 7B illustrate another non-limiting bending operation example in which a user holds the mobile device 100 with two hands on the right and left sides of the case 101 and bends the mobile device 100 at a center region of the touch panel 8 resulting in the electrostatic capacitance distribution pattern illustrated in FIG. 7B. FIGS. 7A and 7B assume that the user bends the mobile device 100 such that the operation surface of the touch panel 8 bends upward (i.e., the operation surface of the touch panel 8 is convex). As illustrated in the exemplary distribution shown in FIG. 7B, the bending operation shown in FIG. 7A results in electrostatic capacitance value differences with respect to the reference values that are lower at the center region of the touch panel 8, while higher electrostatic capacitance differences are experienced in surrounding areas of the center region of the touch panel 8.

In any of the examples shown in FIGS. 3 through 7, a boundary line delineating an area in which electrostatic capacitance values are above a predetermined threshold and those below the predetermined threshold may be determined, and the boundary between these electrostatic capacitance value threshold regions may be linear or non-linear. As a non-limiting example, the controller 1 may determine a boundary line corresponding to a sensor value distribution pattern by determining whether a magnitude difference between adjacent sensor values exceeds a predetermined threshold. As another non-limiting example, the controller 1 may determine sensor coordinates at which adjacent sensors have electrostatic capacitance values above and below the predetermined threshold. The controller 1 may then determine the boundary line based on the determined coordinates. In certain aspects of the present disclosure, the controller 1 determines a continuous function corresponding to the coordinates. In other aspects of the present disclosure, the controller 1 may fit a function to the coordinates. In other aspects of the present disclosure, the controller 1 may determine a discontinuous function. In other aspects of the present disclosure, the controller 1 may determine separate functions corresponding to boundary lines in predefined regions of the touch panel 8.

Figure 8:
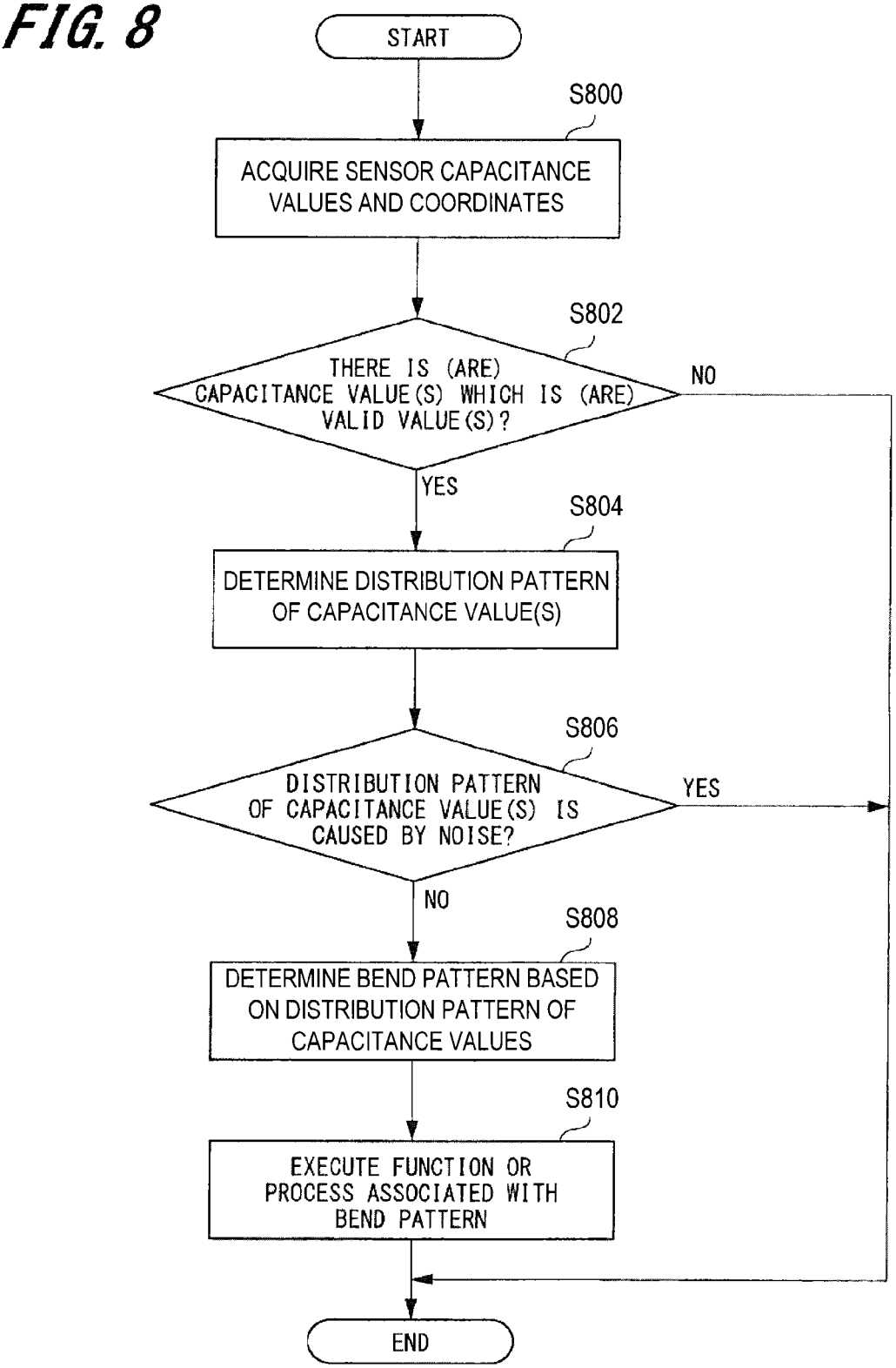
FIG. 8 illustrates an exemplary algorithmic flow chart for executing a predetermined process or function based on features of a determined bending operation according to one aspect of the present disclosure.

Next, FIG. 8 illustrates an exemplary algorithmic flow chart for determining a distribution pattern resulting from bending a mobile device and executing a predetermined function and/or process associated with the bend pattern. At step S800, the sensor value distribution pattern determination section 13 attains electrostatic capacitance values and corresponding coordinates of touch sensors included in the touch panel 8. In certain embodiments, only those electrostatic capacitance values above a predetermined threshold are acquired at step S800. Alternatively, all sensor values included in the touch panel 8 may be acquired, and the sensor value distribution pattern determination section 13 may analyze all the acquired sensor values and determine which sensor values and corresponding coordinates are above the predetermined threshold. In certain aspects of the present disclosure, the touch panel 8 may be divided into quadrants, and only the sensor values included in a particular quadrant (e.g., a quadrant in which an input operation detection is made) may be analyzed, thereby improving efficiency.

At step S802, the sensor value distribution pattern determination section 13 determines the validity of the sensor values acquired at step S800. In certain embodiments, validity may be determined by detecting the presence of absence of a coordinate corresponding to an acquired electrostatic capacitance value. If the sensor value distribution pattern determination section 13 determines at step S802 that one or more acquired sensor values is invalid, the processing is completed. Otherwise, a distribution pattern of the acquired valid capacitance values is determined by the sensor value distribution pattern determination section 13 at step S804.

At step S806, the sensor value distribution pattern determination section 13 determines whether the distribution pattern of electrostatic capacitance values determined at step S804 is a result of noise detected by the touch panel 8 sensors. If the determined electrostatic capacitance distribution pattern is the result of noise, then the processing is completed at this point. Otherwise, the bending pattern determination section 14 determines at step S808 a pattern corresponding to bending the mobile device 100. The bending pattern is determined by the bending pattern determination section 14 based on an analysis of the determined electrostatic capacitance distribution pattern determined at step S804. In certain embodiments, the determination of bend pattern at step S808 may include classifying the bend operation based on characteristics exhibited by the electrostatic capacitance value distribution pattern. For example, the bending pattern determination section 14 may classify bend operations based on a location on the mobile device 100 at which the bend operation is performed. As another example, the bending pattern determination section 14 may classify the bending operation performed on the mobile device 100 based on whether the operation surface of the touch panel 8 is bent to be convex or concave. Further, the bending pattern determination section 14 may classify a bending operation based on the magnitude of force applied to the mobile device 100 during the bending operation or the directionality of the bending operation. In certain aspects of the present disclosure, bending patterns may be classified based on comparisons of predetermined capacitance value distribution patterns stored in memory.

After determining the bending pattern at step S808, the controller 1 at step S810 executes a predetermined function and/or process corresponding to features of the determined bend pattern. For example, a plurality of predetermined bend patterns corresponding to particular aspects of electrostatic capacitance distribution patterns may be stored in advance in the memory 10 and matched to the bend patterns determined at step S808. In response to matching the determined bend patterns with the stored bend patterns, the controller 1 may execute one or more functions and/or processes based on the determination.

Non-limiting examples of predetermined functions and/or processes that may be executed by the controller 1 in response to determining a bend pattern include turning pages in an electronic book displayed on the mobile device 100, scrolling content displayed in an interface or Web browser, performing control input operations on a web browser (e.g., loading, selecting, searching, refreshing, back/forward a page, etc.), performing zoom operations on content included in a displayed interface, responding to communications received on the mobile device 100, adjusting a volume output by the speaker 4, capturing an image by a camera included in the mobile device 100, returning to an interface home screen, skipping and/or selecting audio tracks output by the speaker 4, acknowledging an alarm, and controlling an external device via one or more communication processors included in the mobile device 100 (e.g., the wireless communication processor 3 and/or the short distance wireless communication processor 12).

As a non-limiting example of controlling an external device based on aspects of the present disclosure, a process for increasing or decreasing audio output from a television receiver may be executed in response to a determined bend pattern, e.g., corresponding to a user bending a corner of the case 101. As another non-limiting example, audio volume may be increased or decreased in response to a determined bend operation corresponding to an opposing corner in which the user is holding the case 101. In this case, a bending operation detected at an upper right corner of the mobile device 100 may increase the television receiver broadcast channel, and a bending operation detected at an upper left corner of the mobile device 100 may decrease the television receiver channel. Similarly, aspects of the two above non-limiting examples may be combined such that control of both the audio and channel of the television receiver may be controlled based on detected bending operations of the mobile device 100. For example, an upper left corner and a lower left corner may control the volume of the television receiver, while the upper right corner and the lower right corner may control the broadcast channel selection of the television receiver. Control signals for executing processing on external devices using aspects of the present disclosure may be transmitted via the wireless communication processor 3 and/or the short distance wireless communication processor 12. Further, external devices controlled using aspects of the present disclosure are not limited to television receivers, as a skilled artisan will easily appreciate.

In any of the exemplary cases set forth above, performing a predetermined process or function based on detected features of a bending operation provides the advantage of improved operability for users when interacting with a mobile device interface. For example, performing a bending operation may be faster and more efficient than a case in which a user must stop gripping the mobile device case in order to perform a touch operation. In the specific example of turning pages in electronic books, a user often holds the mobile device with two hands on opposing sides of the mobile device, in which case the present disclosure provides the advantage of more easily turning to the next page by performing a bending operation on the mobile device edge rather than having to touch the screen.

It should be appreciated that the gestures and bending operations described in the examples set forth herein are provided merely for illustration purposes and should not be construed as limiting. Further, aspects of the present disclosure are not limited to detecting bend operations only on the touch panel 8 and the case 101. Additionally, the exemplary sensor value patterns set forth in the examples are not limiting, and other sensor value distributions may result from the bending operations described herein. Moreover, the predetermined functions and/or processes executed in response to determining a bend pattern may be executed while the user is holding the mobile device 100 with one or both hands. In this case, operations are not limited to a sensor value distribution pattern corresponding to the case in which one side of the case 101 is held while another side of the case 101 produces the bending. For example, some functions and processes may correspond to a bending operation in which a user twists the case 101 with both hands. Further, the present disclosure is not limited by the use of an electrostatic capacitive type touch panel, and those of ordinary skill will appreciate that other touch panel technologies may be implemented for detecting bending operations (e.g., resistive film-type touch panels). In certain aspects of the present disclosure, the rigidity of the case 101 may also be weakened so that it may become easier to detect the bending operation in which the case 101 is bent by the user.

Obviously, numerous modifications and variations of the present disclosure are possible in light of the above teachings. It is therefore to be understood that within the scope of the appended claims, the aspects of the present disclosure may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed. For example, aspects of the present disclosure may be implemented using a smart phone, a tablet computer, a gaming terminal, an electronic book reader, a navigation unit, a display monitor, a laptop computer, a universal remote control, or the like.

It must be noted that, as used in the specification and the appended claims, the singular forms "a," "an," and "the" include plural referents unless the context clearly dictates otherwise.

The above disclosure also encompasses the embodiments noted below.

(1) An apparatus comprising: a touch panel display including one or more sensors for detecting an input operation on the touch panel display, wherein the input operation corresponds to bending the touch panel display; and circuitry configured to: determine a distribution pattern based on sensor values and corresponding coordinates output when the input operation is detected; determine, based on the distribution pattern, one or more features of the bending of the touch panel display; and execute a predetermined function or process corresponding to the features of the bending.

(2) The apparatus of (1), wherein the circuitry determines the one or more features of the bending based on an area of the distribution pattern.

(3) The apparatus of (1) or (2), wherein the circuitry determines the one or more features of the bending based on a location of the distribution pattern on the touch panel display.

(4) The apparatus of any one of (1) to (3), wherein the circuitry determines the one or more features of the bending based on a magnitude of the sensor values output when the input operation is detected.

(5) The apparatus of any one of (1) to (4), wherein the circuitry determines a boundary line corresponding to the distribution pattern by determining whether a magnitude difference between adjacent sensor values exceeds a predetermined threshold.

(6) The apparatus of any one of (1) to (5), wherein the boundary line is substantially linear.

(7) The apparatus of any one of (1) to (6), wherein the predetermined function or process corresponds to generating a control signal and outputting the control signal to an external device via a communication interface.

(8) The apparatus of any one of (1) to (7), wherein: the circuitry calculates an area of the distribution pattern and compares the area to a predetermined threshold corresponding to a touch operation distribution pattern area, and the circuitry executes a different predetermined function or process when the calculated area is less than the threshold than when the calculated area is greater than the threshold.

(9) The apparatus of any one of (1) to (8), wherein: the circuitry determines a maximum sensor value, of the sensor values included in the distribution pattern determination, and compares the maximum sensor value to a predetermined threshold corresponding to a touch operation sensor value output, and the circuitry executes a different predetermined function or process when the maximum sensor value is less than the threshold than when the maximum sensor value is greater than the threshold.

(10) The apparatus of any one of (1) to (9), wherein the predetermined function or process corresponds to turning a page on an electronic book displayed on the touch panel display.

(11) A method of controlling an apparatus that includes a touch panel display having one or more sensors for detecting an input operation on the touch panel display, the input operation corresponding to bending the touch panel display, the method comprising: determining, by circuitry, a distribution pattern based on sensor values and corresponding coordinates output when the input operation is detected; determining, by the circuitry and based on the distribution pattern, one or more features of the bending of the touch panel display; and executing, by the circuitry, a predetermined function or process corresponding to the features of the bending.

(12) The method of (11), wherein the circuitry determines the one or more features of the bending based on an area of the distribution pattern.

(13) The method of (11) or (12), wherein the circuitry determines the one or more features of the bending based on a location of the distribution pattern on the touch panel display.

(14) The method of any one of (11) to (13), wherein the circuitry determines the one or more features of the bending based on a magnitude of the sensor values output when the input operation is detected.

(15) The method of any one of (11) to (14), wherein the circuitry determines a boundary line corresponding to the distribution pattern by determining whether a magnitude difference between adjacent sensor values exceeds a predetermined threshold.

(16) The method of any one of (11) to (15), wherein the boundary line is substantially linear.

(17) The method of any one of (11) to (16), wherein the predetermined function or process corresponds to generating a control signal and outputting the control signal to an external device via a communication interface.

(18) The method of any one of (11) to (17), wherein: the circuitry calculates an area of the distribution pattern and compares the area to a predetermined threshold corresponding to a touch operation distribution pattern area, and the circuitry executes a different predetermined function or process when the calculated area is less than the threshold than when the calculated area is greater than the threshold.

(19) The apparatus of any one of (11) to (18), wherein: the circuitry determines a maximum sensor value, of the sensor values included in the distribution pattern determination, and compares the maximum sensor value to a predetermined threshold corresponding to a touch operation sensor value output, and the circuitry executes a different predetermined function or process when the maximum sensor value is less than the threshold than when the maximum sensor value is greater than the threshold.

(20) A non-transitory medium having instructions stored therein that when executed by one or more processors causes the one or more processors to perform a method comprising: detecting an input operation on a touch panel display, the input operation corresponding to bending the touch panel display; determining a distribution pattern based on sensor values and corresponding coordinates output when the input operation is detected; determining, based on the distribution pattern, one or more features of the bending of the touch panel display; and executing a predetermined function or process corresponding to the features of the bending.

The invention claimed is:

1. An apparatus comprising:
a touch panel display including one or more sensors configured to detect an input operation on the touch panel display, the input operation corresponding to bending the touch panel display; and
circuitry that executes computer-readable instructions to:
determine whether sensor values corresponding to the input operation are valid;
if all the sensor values are determined to be valid:
determine a distribution pattern based on the sensor values and corresponding coordinates output when the input operation is detected;
determine, based on the distribution pattern, one or more features of the bending of the touch panel display; and
execute a predetermined function or process corresponding to the features of the bending; and
if one or more of the sensor values are determined to be invalid, end processing of all of the sensor values without determining said distribution pattern, determining said one or more features, or executing said predetermined function or process.

2. The apparatus of claim 1, wherein
the circuitry executes the computer-readable instructions to determine the one or more features of the bending based on an area of the distribution pattern.

3. The apparatus of claim 1, wherein
the circuitry executes the computer-readable instructions to determine the one or more features of the bending based on a location of the distribution pattern on the touch panel display.

4. The apparatus of claim 1, wherein
the circuitry executes the computer-readable instructions to determine the one or more features of the bending based on a magnitude of the sensor values output when the input operation is detected.

5. The apparatus of claim 1, wherein
the circuitry executes the computer-readable instructions to determine a boundary line corresponding to the distribution pattern by determining whether a magnitude difference between adjacent sensor values exceeds a predetermined threshold.

6. The apparatus of claim 5, wherein
the boundary line is substantially linear.

7. The apparatus of claim 1, wherein
the predetermined function or process corresponds to generating a control signal and outputting the control signal to an external device via a communication interface.

8. The apparatus of claim 1, wherein:
the circuitry executes the computer-readable instructions to calculate an area of the distribution pattern and to compare the area to a predetermined threshold corresponding to a touch operation distribution pattern area, and
the circuitry executes the computer-readable instructions to execute a different predetermined function or process when the calculated area is less than the threshold than when the calculated area is greater than the threshold.

9. The apparatus of claim 1, wherein:
the circuitry executes the computer-readable instructions to determine a maximum sensor value, of the sensor values included in the distribution pattern determination, and to compare the maximum sensor value to a predetermined threshold corresponding to a touch operation sensor value output, and
the circuitry executes the computer-readable instructions to execute a different predetermined function or process when the maximum sensor value is less than the threshold than when the maximum sensor value is greater than the threshold.

10. The apparatus of claim 1, wherein
the predetermined function or process corresponds to turning a page on an electronic book displayed on the touch panel display.

11. A method of controlling an apparatus that includes a touch panel display having one or more sensors for detecting an input operation on the touch panel display, the input operation corresponding to bending the touch panel display, the method comprising:
determining, by circuitry, whether sensor values corresponding to the input operation are valid;
if all of the sensor values are determined to be valid:
determining, by the circuitry, a distribution pattern based on the sensor values and corresponding coordinates output when the input operation is detected;
determining, by the circuitry and based on the distribution pattern, one or more features of the bending of the touch panel display; and
executing, by the circuitry, a predetermined function or process corresponding to the features of the bending; and
if one or more of the sensor values are determined to be invalid, ending processing of all of the sensor values without determining said distribution pattern, determining said one or more features, or executing said predetermined function or process.

12. The method of claim 11, wherein
the determining the one or more features of the bending is carried out based on an area of the distribution pattern.

13. The method of claim 11, wherein
the determining the one or more features of the bending is carried out based on a location of the distribution pattern on the touch panel display.

14. The method of claim 11, wherein
the determining the one or more features of the bending is carried out based on a magnitude of the sensor values output when the input operation is detected.

15. The method of claim 11, wherein
the determining the distribution pattern comprises determining a boundary line corresponding to the distribution pattern by determining whether a magnitude difference between adjacent sensor values exceeds a predetermined threshold.

16. The method of claim 15, wherein
the boundary line is substantially linear.

17. The method of claim 11, wherein
the predetermined function or process corresponds to generating a control signal and outputting the control signal to an external device via a communication interface.

18. The method of claim 11, wherein:

the determining the one or more features of the bending comprises calculating an area of the distribution pattern and comparing the area to a predetermined threshold corresponding to a touch operation distribution pattern area, and the executing comprises executing a different predetermined function or process when the calculated area is less than the threshold than when the calculated area is greater than the threshold.

19. The method of claim 11, wherein:

the determining the one or more features of the bending comprises determining a maximum sensor value, of the sensor values included in the distribution pattern determination, and comparing the maximum sensor value to a predetermined threshold corresponding to a touch operation sensor value output, and the executing comprises executing a different predetermined function or process when the maximum sensor value is less than the threshold than when the maximum sensor value is greater than the threshold.

20. A non-transitory medium having instructions stored therein that when executed by one or more processors cause the one or more processors to perform a method comprising:

detecting an input operation on a touch panel display, the input operation corresponding to bending the touch panel display;

determining whether sensor values corresponding to the input operation are valid;

if all of the sensor values are determined to be valid:

determining a distribution pattern based on the sensor values and corresponding coordinates output when the input operation is detected;

determining, based on the distribution pattern, one or more features of the bending of the touch panel display; and executing a predetermined function or process corresponding to the features of the bending; and if one or more of the sensor values are determined to be invalid, ending processing of all of the sensor values without determining said distribution pattern, determining said one or more features, or executing said predetermined function or process.

* * * * *